United States Patent [19]

True

[11] 4,074,265
[45] Feb. 14, 1978

[54] MICROWAVE POWER COMBINER

[75] Inventor: Richard Brownell True, Sunnyvale, Calif.

[73] Assignee: Litton Systems, Inc., San Carlos, Calif.

[21] Appl. No.: 724,930

[22] Filed: Sept. 20, 1976

Related U.S. Application Data

[63] Continuation-in-part of Ser. No. 504,456, Sept. 9, 1974, Pat. No. 3,986,188.

[51] Int. Cl.² ........................... G01S 7/38; H01P 5/12
[52] U.S. Cl. ...................................... 343/18 E; 333/11
[58] Field of Search ......................... 333/11; 343/18 E

[56] References Cited

U.S. PATENT DOCUMENTS

| | | | |
|---|---|---|---|
| 2,686,901 | 8/1954 | Dicke | 333/11 X |
| 3,315,183 | 4/1967 | Buhn et al. | 333/11 |
| 3,383,630 | 5/1968 | Kuroda | 333/11 |

OTHER PUBLICATIONS

Allen, *The Turnstile Circulator,* IRE Trans. on MTT, 10/56 p. 223 cited.

*Primary Examiner*—Paul L. Gensler
*Attorney, Agent, or Firm*—Ronald M. Goldman

[57] ABSTRACT

An electronic countermeasures system for use at an operating frequency, $f$, includes a receiving antenna, a transmitting antenna, and first and second turnstile junctions, in which each of the junctions comprises the geometry of four rectangular ridged waveguides arranged as arms in the shape of a cross, and a fifth cylindrical quadridge waveguide opening into the common intersection of said arms and extending orthogonal to such formed cross and with each of two opposed ones of the waveguide arms including a short circuit termination, the effective distance between such short circuit terminations being equal to one-half wavelength at the operating frequency. Included in this combination are means for coupling the output of the receiving antenna to the fifth waveguide means of the first junction serving as an input; means for coupling the transmitting antenna input to the fifth waveguide means of the second junction serving as an output; first signal processing means coupled between one arm of said first junction and the corresponding input arm of said second junction; and second signal processing means coupled between the remaining arm of said first junction and the remaining corresponding arm of said second junction.

1 Claim, 10 Drawing Figures

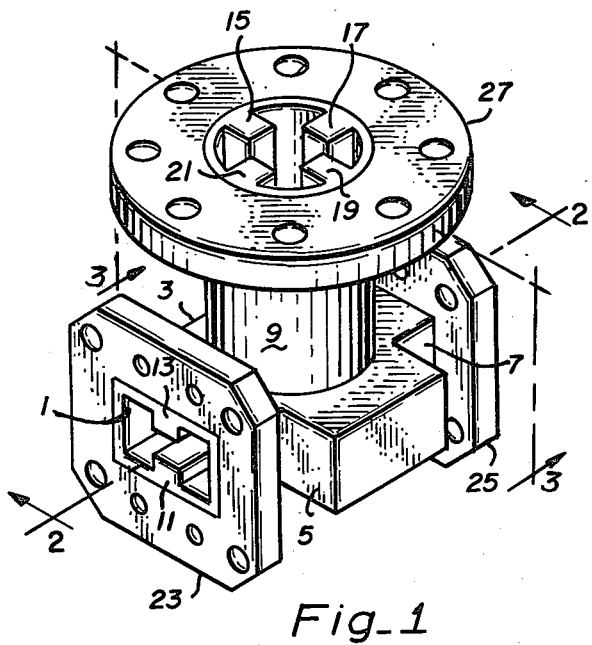
Fig_1
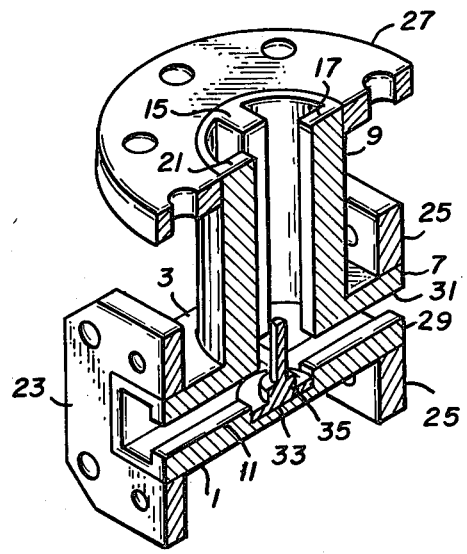
Fig_2
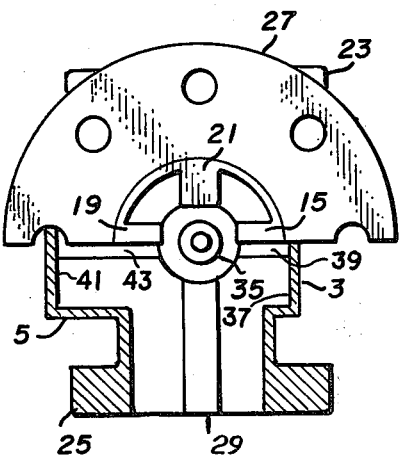
Fig_3
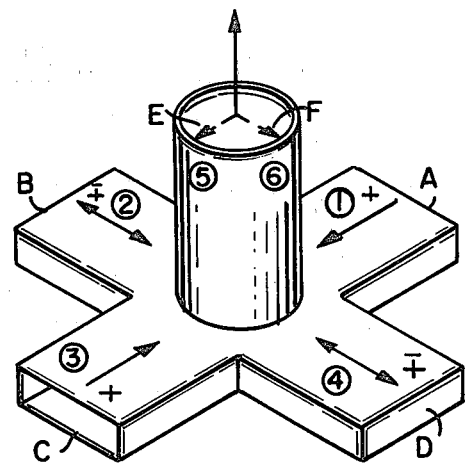
Fig_4

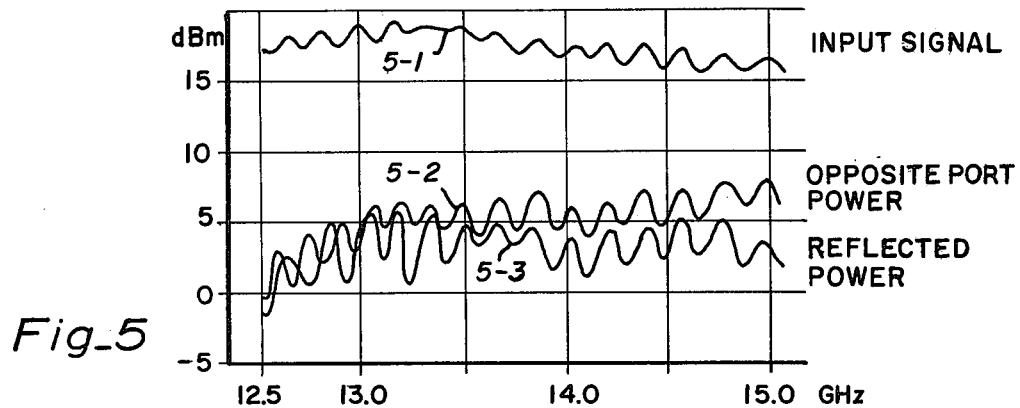
Fig_5
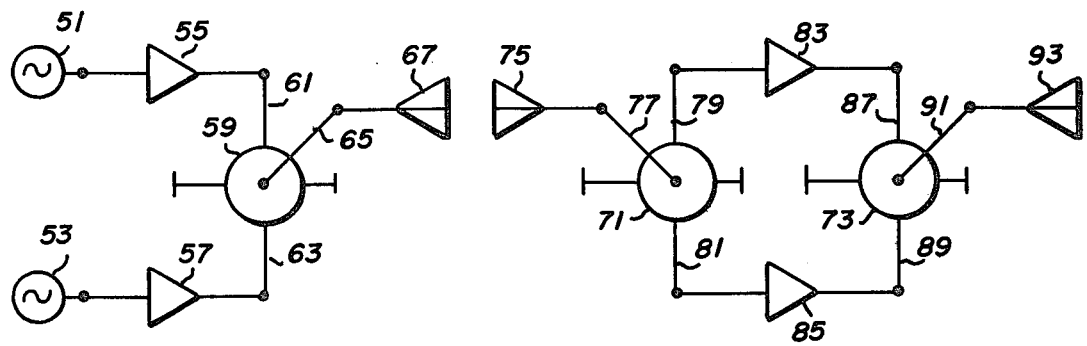
Fig_6  Fig_7
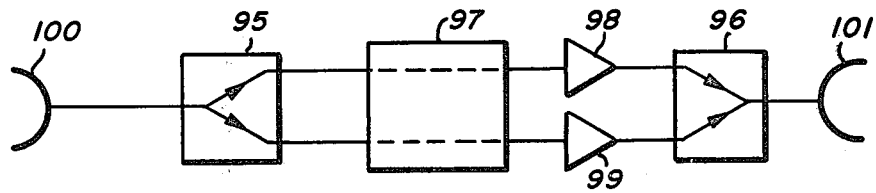
Fig_8
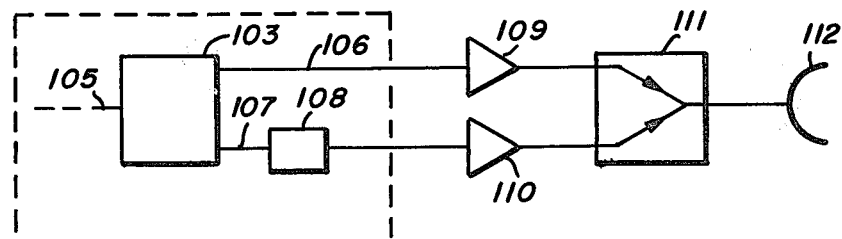
Fig_9

MICROWAVE POWER COMBINER

REFERENCE TO RELATED APPLICATIONS

The present application is a continuation-in-part of my earlier filed application for patent, Ser. No. 504,456, filed Sept. 9, 1974, for a DUAL MODE MICROWAVE AMPLIFIER SUBSYSTEM and now U.S. Pat. No. 3,986,188, granted Oct. 12, 1976.

BACKGROUND OF THE INVENTION

The present invention relates to microwave power combining elements and, in addition, relates to microwave amplifier subsystems useful in providing dual mode operation in an electronic countermeasures system incorporating microwave power combining elements.

DESCRIPTION OF THE PRIOR ART

Microwave power combining elements having the function of coupling one or more microwave signal sources to a single output or transmission line, without causing interfering interaction between the individual microwave signal sources, have been known heretofore. One type of power combining device which I believe is most related to that of the present invention is that known as the "turnstile junction". Such type of device appears to be disclosed in U.S. Pat. No. 2,965,896, issued Dec. 1960, to Lewis, and in my prior patent application Ser. No. 504,456, filed Sept. 9, 1974, of which the present application is a continuation-in-part, and in the literature, such as Altman, *Microwave Circuits,* D. Van Nostrand, 1964, pp. 126-133; Smullin and Montgomery, *Microwave Duplexers,* McGraw-Hill, 1948, pp. 372-375; Meyer and Goldberg, *IRE Trans. MTT,* Vol. MTT3, No. 6, pp. 40-55, December 1955. Additional representations of such junction structure also appears in U.S. Pat. No. 2,686,901, issued August 1954, to Dicke, and in Allen, *The Turnstile Circulator,* IRE Transactions on MTT of October 1956. In one structural form the turnstile junction contains two pairs of perpendicular and co-planar input arms and a circular waveguide output oriented perpendicular to the plane formed by the input arms. It is a symmetrical six-port device comprising four rectangular waveguides operating in the TE10 mode and forming a "cross" configuration in the H-plane and a circular waveguide operating in the TE11 mode whose axis is perpendicular to the plane of the formed cross. That microwave component has the peculiar and unique electrical property of providing an output from its circular output arm in response to two equal and oppositely phased signals being applied to one pair of input arms without interacting or providing passage of those signals to the remaining pair of inputs. Likewise, equal and oppositely phased microwave signals applied across the inputs of the remaining pair do not emerge at the inputs of the first pair but instead propagate through the output arm. The present invention is considered as a modification or improvement to the structure of the turnstile junction and to the dual mode type electronic countermeasures system incorporating such a power combining element.

Thus as is described in my prior co-pending patent application, various electronic countermeasures systems have been used for protecting aircraft by defeating or deceiving radar systems, the now conventional and well-known means used to electronically detect and determine the position, altitude, etc. of flying aircraft. Present day countermeasures systems perform this function in either two ways, as has been reported in newspaper and other publicly available literature. In one, a generator of broad spectrum continuous wave microwave energy is operated which generates continuous electronic "noise". This noise is picked up by the offending radar and is added to the ambient electronic "background signals", the normal "noise", received by the radar. To detect an intruding aircraft in the normal operation of the radar, the radar transmits synchronized pulses and the operator must observe the "echo", the electromagnetic energy pulse reflected by the intruding aircraft. A high level of noise "masks" or clutters the pulses as may be reflected from such approaching aircraft and the radar is unable to detect its presence. At some position of the approaching aircraft, however, the radar echo becomes large enough in magnitude to exceed the electronically generated jamming noise and the echo is detected. At this position the approaching aircraft is electronically visible.

As is apparent, if the power level of the electronic noise source could be infinitely large, the radar system is permanently defeated and the approaching aircraft would always appear electronically "hidden". In practice the electronic noise sources are limited to state of the art power levels. Thus at some position of approach, in part depending upon the power generated by the countermeasures noise source, the approaching aircraft becomes electronically "visible" and a second countermeasures system carried by the aircraft must be placed into operation if that aircraft is to remain protected. The second electronic countermeasures equipment in the aircraft detects incidence of an electronic signal from the offending radar station and thereupon transmits a "false" echo. This false echo is sufficiently greater in power and predominates over the "real" echo. The false echo represents false information and the offending radar installation makes an incorrect determination of the position of the approaching aircraft. Thus any antiaircraft missiles launched relying upon the radar information are misdirected. In countermeasures terminology, the operation of equipment to generate continuous noise is referred to as "CW mode" operation and the operation of such equipment to transmit false pulses is referred to frequently as the "pulse mode".

To that end a small sized lightweight countermeasures system to be carried by each individual aircraft having capability for operation in both of the afore cited "modes" of operation, sometimes referred to as "dual mode" capability, is a desirable protective device. One of the critical components of present day countermeasures equipment is the traveling wave tube, a microwave tube which amplifies microwave frequency signals. A first known approach to this requirement uses a single traveling wave tube capable of operation in both the CW mode and in the pulse mode. This approach obviously reduces weight and volume of countermeasures equipment to a minimum, however, performance is limited in regard to that desired.

A second known approach employs two traveling wave tubes: a first traveling wave tube designed for and operated in the continuous wave mode which feeds the CW energy into a second traveling wave tube. The second traveling wave tube is especially designed for two purposes: (1) to provide a high power pulse output signal when the system is placed in the pulse mode, and (2) to be electronically transparent, much as a window, to CW microwave signals from the first tube when the system is operating in the continuous wave mode. It is apparent that if the first tube in such a system fails in service, both the CW and pulse mode countermeasures capability fails, whereas if the second tube fails there may only be remaining the CW mode countermeasures capability.

A third method uses pulse and continuous wave traveling wave tubes followed by a hybrid junction to combine power. Disadvantages in this approach include the fact that if a single antenna is to be driven, roughly one-half of the power is lost in the combiner, or if fore and aft antennas are driven by the two hybrid output ports, phase will necessarily be dissimilar in the antennas depending on the mode of operation.

SUMMARY OF THE INVENTION

Accordingly, the present invention provides as an object in a countermeasures system a passive microwave power combining element for coupling microwave energy from two separate sources into a single output without causing adverse interacting interference between the two sources. In another aspect, an object of the invention is to provide an improved countermeasures system using the microwave power combining element in which failure of one amplifier section does not result in failure of the remaining amplifier section, and vice versa, and which is effective against radars having polarization of arbitrary orientation and type.

The microwave power combining element in my invention comprises four double ridge waveguides formed as arms into a cross configuration which open into a quadridge square or circular output waveguide, oriented orthogonal to the cross and communicating with the four waveguides at the point of cross intersection. Two opposed ones of the double ridge waveguides are terminated electrically in short circuits, such as by the inclusion of an electrically conductive wall. The two arms so terminated lie along the axis of the cross perpendicular to the two remaining double ridge waveguides. The remaining waveguides serve as the first and second input ports, respectively, of the power combiner. The combiner exhibits the characteristic that with either input port supplied with microwave energy from a source, the input power is split with 50 percent of the power propagating directly out of the orthogonally oriented output port with the polarization vector oriented along the driven port cross axis and the remaining half of the power is divided equally and coupled into the short-circuited terminated waveguide arms. The power in the shorted arms is thereupon reflected from the short-circuit terminations with the phase length of the waveguide set so that the signals which are initially in phase return out of phase by 180°. The power recombines in the junction and propagates out of the output port with the polarization vector oriented perpendicular to the driven port cross axis. Ideally none of the power so reflected from the short-circuited arms is coupled into the nondriven input port. In a more specific aspect of the invention, the electrical length of the shorted waveguide arms is chosen so that one vector component of the output power is in time quadrature with the other which results in a circularly polarized wave in the output waveguide. In accordance with the invention a first and second power combining element of the foregoing type is provided. A receiving antenna and a transmitting antenna are coupled respectively to the circular waveguide of the first and second microwave power combining elements, and first signal processing means is coupled between an input arm of the first combining junction and a corresponding input arm of the second junction, and a second signal processing means is coupled between the remaining opposed input arm of the first junction and the corresponding opposed input arm of said second junction.

The foregoing objects of my invention, as well as additional objects and advantages thereof and the nature of the elements comprising my invention and their functional cooperation, are better understood by giving consideration to the detailed description of the various embodiments of the invention which follows taken together with the figures of the drawings.

BRIEF DESCRIPTION OF DRAWINGS

FIG. 1 is an elevation view of the microwave power combiner included in the invention;

FIG. 2 is a section view of the embodiment of FIG. 1 taken along the lines 1—1;

FIG. 3 is a top partial section view of the embodiment of FIG. 1 taken along the lines 2—2;

FIG. 4 is a symbolic illustration of the embodiment of FIG. 1;

FIGS. 5 and 10 graphically illustrates the results obtained from a practical embodiment of the invention.

FIG. 6 illustrates symbolically a countermeasures system incorporating the invention of FIG. 1;

FIG. 7 is a symbolic illustration of another electronic countermeasures system utilizing the microwave power combining element of the invention; and FIGS. 8 and 9 illustrate symbolically additional countermeasures systems embodying the invention.

DESCRIPTION OF THE PREFERRED EMBODIMENTS

Figure 10:
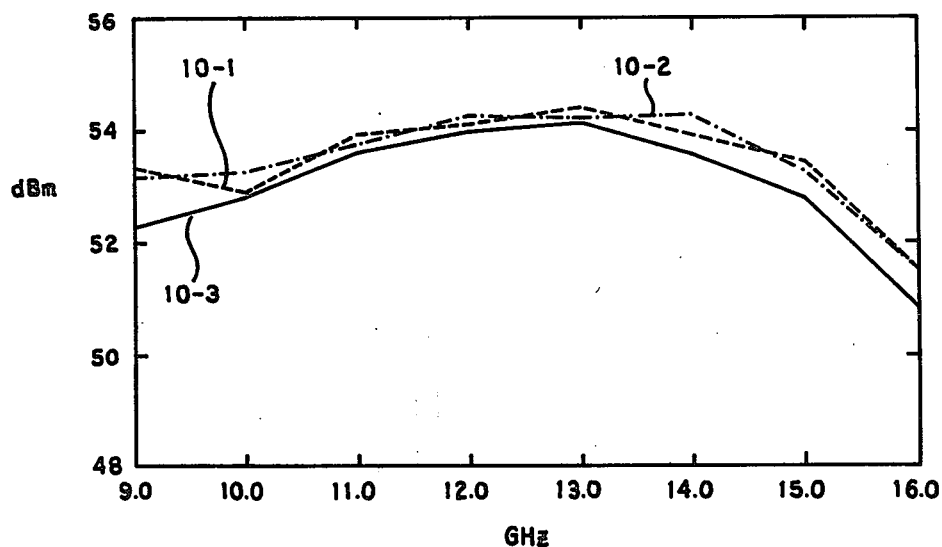

The microwave power combiner as illustrated in FIG. 1 includes four waveguide arms, 1, 3, 5 and 7. The waveguide arms are arranged co-planar in the form of a cross in which waveguides 3 and 5 are located along a common axis, waveguides 1 and 7 are located along a common axis, and such common axes are oriented perpendicular to one another. A fifth circular quadridge waveguide, 9, extends from the intersection of the cross orthogonal to the axes of waveguides 1, 3, 5 and 7. All of the aforedescribed waveguides open into a common cavity or chamber so as to form communicating passages therebetween, not visible in this figure, and an impedance matching element is disposed in the chamber for matching the impedance characteristics of the quadridge waveguide 9 with the other waveguides. Waveguide 1 is of the conventional double ridge variety, including opposed ridges 11 and 13 which extend along the length of the waveguide. Each of the other waveguides 3, 5 and 7 are similarly of the double ridge type. Waveguide 9, however, is of the circular quadridge variety which contains four axially extending ridges 15, 17, 19 and 21. An end coupling flange 23 is attached to waveguide 1 and another end waveguide coupling flange 25 is attached to an end of waveguide 7. A circular waveguide flange 27 is attached to the end of the waveguide 9. These flanges are all of known structure and contain bolt holes for coupling to mating flanges of other microwave waveguides, not illustrated, in a microwave system. As is apparent from the figure, waveguide 5 has its remote end closed by a conductive wall which provides a short-circuit termination. Although not visible in this view, waveguide 3 is similarly terminated by a conductive wall. Suitably the aforedescribed elements may be constructed of an electroformed copper material.

Reference is now made to the section views of the embodiment of FIG. 1 presented in FIGS. 2 and 3. For convenience the designation of the elements illustrated in FIG. 1 and described previously are used in FIGS. 2 and 3 to designate those same elements where they appear in these additional figures.

The section view of FIG. 2 taken along the lines 2—2 in FIG. 1 thus includes the waveguide 9 and flange 27, the waveguide 7 and flange 25, the waveguide 1 and flange 23, the waveguide 3. A portion of ridges 21 and 17 and ridge 15 in waveguide 9 are all visible in this view. The waveguide is seen to be of a cylindrical construction and the radially inwardly projecting portions or ridges extend parallel to the waveguide axis a predetermined length into open communication with the space formed by waveguides 1 and 7. A portion of the axially extending ridges of waveguide 7, 29 and 31, are visible in this view. The waveguide 7 and its ridges extend a predetermined length into an open area at the intersection of the waveguide arms to form a passage communicating with each of the other waveguides. Waveguide 1 and ridges 11 and 13 extend a predetermined length into the same area. Suitably waveguides 7 and 1 are of substantially identical length. Waveguide 3 similarly has a passage communicating with the same central area as well as waveguide 5, not illustrated in this figure.

A well-like surface 33 is formed in the chamber area. Seated or attached within this area is a stepped pedestal-like member 35, an impedance matching element, which contains a washer-like base, a narrow cylindrical protrusion, and an even more narrow probe-like member extending from the central area into the passage of waveguide 9 a predetermined length. Element 35 matches the differing impedance characteristics of the quad-ridge waveguide 9 with that of the double ridge waveguides 1, 3, 5 and 7.

The construction of waveguides 3 and 5 is better illustrated in the section view of FIG. 3 which is taken along the lines 3—3 of the embodiment of FIG. 1. This section view is rotated 180° from the view in FIG. 1 so that flange 25 appears in front. Line 3 is seen to be short-circuited at an end by conductive wall 37 and contains double ridges, including bottom ridge 39 visible in this figure. Similarly, waveguide 5 includes the conductive rear wall 41 and a double ridge with the lowermost ridge 43 visible partially in this figure. The waveguide extends symmetrically about the axis shown, although the remaining view is blocked by the flange 27.

As is apparent, waveguide 5 defines a passage or short-circuited waveguide transmission line of a first predetermined length, and waveguide 3 defines a short-circuited waveguide transmission line of a second predetermined length, with the latter being significantly greater in length than the length of waveguide 5, the purposes of which become more apparent hereinafter.

Reference is now made to FIG. 4 which symbolically illustrates the power combiner and is helpful in considering the relationship and function of the elements. Each of the two input waveguides is represented by an arm, A and C, and each of the short-circuited waveguide arms is represented by arms B and D. The combiner is based upon classical turnstile junction mathematics and its behavior may be understood by consideration of the mathematical equations which govern both the turnstile junction and this combiner. Thus, assuming that there are no losses within the junction, then the following relationships exist:

$$V_A^- = \tfrac{1}{2}(V_B^+ + V_D^+ + \sqrt{2}\,V_E^+) \quad (1)$$

$$V_B^- = \tfrac{1}{2}(V_A^+ + V_C^+ + \sqrt{2}\,V_F^+) \quad (2)$$

$$V_C^- = \tfrac{1}{2}(V_B^+ + V_D^+ - \sqrt{2}\,V_E^+) \quad (3)$$

$$V_D^- = \tfrac{1}{2}(V_A^+ + V_C^+ - \sqrt{2}\,V_F^+) \quad (4)$$

$$V_E^- = \tfrac{1}{2}(\sqrt{2}\,V_A^+ - \sqrt{2}\,V_C^+) \quad (5)$$

$$V_F^- = \tfrac{1}{2}(\sqrt{2}\,V_B^+ - \sqrt{2}\,V_D^+) \quad (6)$$

The voltages designated by the symbols $V$ are complex voltages. The plus superscript denotes that a signal is entering the given arm or port and a minus superscript indicates that the microwave signal is leaving the given port.

$V_A$ represents the voltage of the RF wave associated with port A; $V_B$ represents the voltage of the RF wave of port B; $V_C$ represents the voltage of the RF wave of port C; $V_D$ represents the voltage of the RF wave of port D; $V_E$ represents the voltage of the RF wave polarized along the axis of input arms A and C; and $V_F$ represents the voltage of the RF wave polarized along the axis of arms B and D.

Assume that microwave energy of a given frequency, $f$, is applied from a source solely to the input port A. What occurs in the combiner is that 50 percent of the incident power propagates directly out of port E and the remaining 50 percent is split equally between ports B and D. Assume that the power in lines B and D acquires a differential phase shift of 180° through propagation to and from the shorts, such as is accomplished by the use of dissimilar length shorted waveguides and which could also be accomplished by other known techniques. Then the power reentering ports B and D, being 180° out of phase, cancels and does not propagate into ports A or C but combines and flows out of port F. Thus if signals B and D reenter the center of the junction shifted with respect to the input signal by 90° and 270° respectively, then the signal polarized in the F direction is in time quadrature with that in the E direction resulting in an output consisting of circularly polarized waves. A similar relationship occurs if port C is driven exclusively by a source of microwave frequency energy, $f$. The difference is that in the latter case the helicity of the polarized output signal is different. Inasmuch as the combiner is a passive reciprocal element, the theory of "superposition" of electrical signals is applicable. Thus ports A and C can be driven simultaneously by different microwave energy sources without mutual interference, and with the resultant output signals superimposed upon one another. Theoretically it is important to note that there exists no combination of input signals which will return power to the other input.

By way of specific example, one practical embodiment of the invention depicted in FIGS. 1 through 3 for use at a center frequency, $f$, of 12 GHz is of the following approximate dimensions: Waveguide 1 is a double ridge waveguide type having a length measured to the center of the cross of 0.875. The opposed waveguide 7 is also of the double ridge type and is of the same length, by way of example, as waveguide 1. The length or distance from the center axis to the rear conductive wall which short-circuit terminates waveguide 3 is 0.749 inches. The corresponding distance between the center axis of the cross and the conductive wall which short-circuits waveguide 5 is approximately 0.466 inches. Each of the waveguides including 3 and 5 is of the double-ridged variety of approximate width of 0.69 inches by a height of approximately 0.32 inches, having centrally located protruding ridges of approximately 0.173 inches in width by 0.068 inches in height. The approximate length of waveguide 3 taken from the wall of waveguide 1 is approximately 0.549 inches and the approximate length of waveguide 5 measured from the adjacent wall of waveguide 1 is approximately 0.266 inches. The centrally located pedestal member 35, visible in the section of FIG. 2, has a base which is approximately 0.436 inches in diameter and is of a height of approximately 0.045 inches. The second pedestal member seated atop the first pedestal is approximately 0.25 inches in diameter and 0.134 inches in height. The cylindrical protruding member extending from the last named pedestal is approximately 0.243 inches in height and approximately 0.1 inches in diameter.

Generalizing mathematically, the distance between the short circuit termination of the short circuited waveguide arms may be expressed in terms of wavelength $\lambda$ of an operating frequency $f$ wherein the distance between the central axis of the turnstile junction and the short circuit termination in one of the rectangular waveguide arms is expressed as $(2N+3)(\lambda/8)$, and the distance between said central axis and the other short circuit termination of the remaining opposed one of the short circuited waveguide arms is approximately equal to the quantity $(2N+1)(\lambda/8)$, where N is any integer, including zero. Thus, for example, taking N as equal to zero, the respective distances are $\frac{3}{8}\lambda$ and $\frac{1}{8}\lambda$ with the overall distance between the two short circuit terminations being equal to the sum of the foregoing, namely, $\frac{1}{2}\lambda$.

FIG. 5 illustrates the results obtained by driving port 1 with a sweep generator at a power level of 50 milliwatts over a frequency range of approximately 12.5 GHz to 15 GHz. Curve 5-1 illustrates the power level of the microwave signals applied to an input arm of the junction, expressed in dbm. Curve 5-2 illustrates the power level that passes to the opposite input arm. Note that the power is about −9 db at about 15 GHz and represents approximately 10 percent of the energy. Thus although theoretically no energy should be coupled between input ports, in practice some energy is so coupled but not enough to render the invention inoperative. Curve 5-3 represents the microwave energy reflected back to the input arm to which the microwave energy is applied and represents approximately 4 percent of the energy. In all cases it is noted that the reflected power is minor and represents a VSWR of no more than 1.5 to 1. The signal coupled to the output arm is of the power level of the input signal although such signal is not depicted in this figure.

As is apparent, the combining junction is designed for operation at one frequency, $f$, and also functions over a band of frequencies to one side or the other, or about the center frequency $f$, which is designated $\pm \Delta f$. As is recognized by those skilled in the art, the electrical length of a transmission line, such as the short-circuited waveguide, is a well-known function of the frequency of the microwave energy applied to the transmission line. Thus, each of the opposed short-circuited transmission lines in the aforedescribed junction were designed to provide phase shift differentials of 90° and 270°, i.e. $\pi/2$ and $3/2\pi$ radians, respectively, at frequency $f$, for a difference of one wavelength $\lambda$ or $\pi$ radians, as variously termed. Where the microwave frequency energy applied to the junction differs from $f$, the line lengths of the short-circuited arms are effectively changed. The usefulness of any specific junction constructed according to the teachings herein contained is at the frequency $f$, and in the frequency range for which it is designed and, in addition, in those adjacent frequencies where the function of the short-circuited arms substantially performs to provide the results characterized in this specification. If the applied frequency departs greatly from that for which the particular junction was designed, the unit becomes nonfunctional at that out-of-range frequency, as is true for any device operated outside of its recommended ratings.

Ideally, improvements hereinafter made to the aforedescribed invention may extend the bandwidth of frequencies over which a given device may be used, i.e. broadbanding the design of the power combiner. One particular modification to the foregoing is to include a broadband phase shifter in one of the shorted arms of the combining junction. Only one such phase shifter is required and this may be placed in the longer one of the shorted arms. Another technique consists of terminating each of the shorted arms with a reactive load having a phase shift that increases inversely with frequency to thus balance or compensate for the electrical shortening of the waveguide with decreasing frequency. With such an addition the effective phase shift of each line remains essentially constant independent of frequency so that the phase differential between the two shorted arms remains at 180° within the range of frequencies over which such reactive load is operable. Certain known periodical filter type lines exhibit that kind of behavior and may be added to the normal waveguide in order to provide effectively a constant phase shift independent of frequency over the frequency band of interest. Thus although the short-circuited arms in the preferred embodiment are formed with a conductive wall to produce the phase shift, the other forms of constructions having the same effect of reflecting microwave energy and acting as a short-circuit termination may be used instead.

A novel microwave subsystem incorporates the microwave power combiner previously described, is presented symbolically in FIG. 6. The subsystem includes a first microwave source 51, a second microwave source 53, a microwave amplifier 55, having its input connected to the output of source 51; a second microwave amplifier 57 having its input connected to the output of source 53; a microwave power combiner 59 of the invention having a first input arm 61 connected to the output of amplifier 55 and a second input arm 63 connected to the output of amplifier 57. The output arm 65 of the combiner is coupled to a radiating antenna 67. In this configuration, the microwave sources 51 and 53 and amplifiers 55 and 57 may take various specific forms, as hereinafter described. Consider each of microwave sources 51 and 53 to be electronic noise sources and amplifiers 55 and 57 to be essentially identical, either a continuous wave CW or a pulse traveling wave tube of conventional type. Power combiner 59 possesses the properties previously discussed. In this specific example, the electronic noise is applied independently to both inputs 61 and 63 of the power combiner. The resultant output signal at 65 supplied to the radiating antenna 67 represents a noise signal having random polarization as well as other aspects of randomness. In a second specific example, amplifier 55 and amplifier 57 may be dual mode traveling wave tubes of any conventional type. Such types of tubes have the two modes of operation, a high power pulse mode and a low power CW mode, under control of a suitable source, not illustrated. In the CW mode the signals supplied by sources 51 and 53 amplified by amplifiers 55 and 57, respectively, and applied to arms 61 and 63 of the power combiner, results in an output at arm 65 and applied to antenna 67, which is a signal of random polarization. In the pulse mode the sources 51 and 53 suitably apply pulses and the output as illustrated is randomly polarized, or the polarization of the signal may be controlled electronically such as by a conventional phase shifting or delay circuit placed in series with one of the sources.

A similar circuit is described in my previously filed co-pending application, Ser. No. 504,456, filed Sept. 9, 1974.

In a still further example of a novel microwave subsystem, the sources and amplifiers associated therewith, such as source 51 and 55 and source 53 and 57, may provide a pulse output and a CW output respectively. These sources may be operated alternately, thus source 51 with amplifier 55 produces a CW output at antenna 67 in one mode of operation, while the other source 53 is not operating, and conversely, in the second mode of operation the deception mode source 53 is turned on and source 51 is turned off so as to provide an output at 67 which are the deceptive pulses. Thus if there is a failure in either half of the system the remaining half is still functional. Again, a similar system using the previous type of turnstile junction is described in my co-pending application, Ser. No. 504,456, filed Sept. 9, 1974. Another microwave subsystem employing the microwave power combining element previously described is illustrated symbolically in FIG. 7. In this I employ two microwave power combiners, 71 and 73. An input or receiving antenna 75 is coupled to the central arm 77 of the combiner. The two output arms, 79 and 81, are connected respectively to the inputs of amplifiers 83 and 85. The outputs of amplifiers 83 and 85 are connected respectively to input arms 87 and 89 of combiner 73. In turn, the output arm 91 of the combiner is connected to a radiating antenna 93. In this embodiment the microwave amplifiers 83 and 85 are of substantially identical structure. In this subsystem, signals received are applied to arm 77 of the power combiner. In this application the power combiner functions as a power splitter, dividing the input signal essentially between the output arms 79 and 81. The signals are then amplified and applied to the input arms 87 and 89 of power combiner 73 where the resultant output signal is taken at arm 91 and reradiated at an increased power level by antenna 93. The effect is to provide an output signal of greater power level and with the same polarization as the input signals. By programming this circuit in a conventional manner, as hereinafter described, the system can function as an electronic countermeasures jammer.

An improved electronic countermeasures system, more particularly, a radar jamming system is symbolically depicted in FIG. 8. This system includes two of the aforedescribed "True" power combiners, 95 and 96, symbolically illustrated; a signal processing network, 97, of any conventional structure; a pair of microwave amplifiers, 98 and 99, which may be identical; a receiving antenna, 100, and a transmitting antenna, 101. In this system, the output of the receiving antenna is coupled to the quadridge waveguide arm or fifth arm of the True power combiner, which is used as an input. The opposed input arms of the combiner, used as outputs, are connected to respective ones of two separate inputs of signal processing network 97. Network 97 in turn provides two outputs connected, respectively, to the inputs of amplifiers 98 and 99 and, in turn, the outputs of amplifiers 98 and 99 are coupled to the input arms of the second power combiner 96. The quadridge waveguide arm or fifth arm of combiner 96 is coupled to transmitting antenna 101. In the aforedescribed system, polarization of the microwave signal from the offending radar received at the receiving antenna is automatically processed so that the signal broadcast from transmitting antenna 101 is of the same polarization. Thus the input to the power combiner 95 is divided into two signals depending upon its polarization into two signals. As is typical of jamming systems, the signals are independently processed. This may provide a delay or a "walking" delay to the signals so that the system provides an output signal which deceives the offending radar as to the location of the aircraft. The processed signals are amplified and applied to the input arms of the power combiner 96 where they are recombined in the output arm and applied to the input of the broadcast antenna 101. The output signal is thus of the same polarization as the received signal. With this system all the available output power is applied to generate a signal for jamming the offending radar. In contrast, other types of countermeasures systems must generally use an output of circular polarization to ensure coverage of a source of arbitrary linear polarization. Thus if the offending radar transmits a signal of unique polarization only a fractional amount of the jamming information contained on a circularly polarized signal may actually be received by the antenna of the offending radar.

FIG. 9 depicts a novel sub-system for a radar system using the power combiner of the invention. An electronic switching network 103 takes microwave signals at an input 105 which signals originate from other parts of a conventional radar system, not illustrated, and provides two outputs, 106 and 107. An electronic phase shifter 108 is connected serially with one of the outputs of switching network 103. A pair of substantially identical microwave amplifiers 109 and 110 is connected to receive the output from 106 and 108, respectively, and to apply the amplified outputs to the input arms of the "True" power combiner 111. The output of the orthogonally oriented fifth arm is connected to a broadcast antenna 112. Effectively, the microwave signals applied to the input arms of the power combiner 111 are of the same frequency and power level but are of a different phase depending upon the phase selected by the phase shifter 108. Thus the radar system including this subsystem possesses polarization variability. Hence, the polarization of the emitted radiation transmitted from broadcast antenna 112 can be programmed to vary from vertical linear polarization around to horizontal linear polarization, then to circular left polarization and then to circular right polarization, by way of example. The received radiation can be correlated with the foregoing program and the response maximized in conventional ways. By the use of this subsystem, effects such as varying radar cross-section and the presence of background electronic noise and all electronic jamming noise is minimized.

FIG. 10 illustrates results I obtained by driving port 1 of a specific embodiment of FIG. 1, previously described, with a broadband CW TWT at a power level of roughly 200 watts over a frequency range of 9 GHz to 16 GHz. Curves 10-1 and 10-2 illustrate the power level of the microwave signals applied to an input arm of the junction, expressed in dbm. In curve 10-1 the power was measured with a calibrated dry load system whereas in FIG. 5-2 a water load system was used. Curve 10-3 illustrates the power level of the output signal after passage through the power combiner measured with the water load system. Summarizing significant performance characteristics of the practical embodiment including its broadband characteristics: (1) VSWR of less than 2.3:1 over an octave plus and roughly 1.5:1 from 10–18 GHz; (2) cross-port coupling tantamont to a VSWR of 2.3:1 maximum over an octave plus; (3) combining loss of less than 1 dB over close to a full octave and not exceeding 1.5 dB over an octave plus; (4) ability to handle without difficulty greater than 300 watts of CW power and 2 kilowatts of peak power at 4 percent duty; (5) simultaneous operation of pulse and CW tubes connected to each of the two input ports of the combiner at the power levels of (4) with no adverse mutual interaction effects. The described power combiner in which the double ridge waveguide is incorporated in the arms; the quad-ridge waveguide, circular but which may also be square, and the particular impedance matching device incorporated in the juncture represents a unique improvement in permitting operation over a wide or broadband of microwave frequencies.

It is believed that the foregoing description of the preferred embodiments of my invention are presented in such sufficient detail as to enable one skilled in the art to make and use same. However, it is expressly understood that the details presented for the aforementioned purpose are not to be construed as limiting my invention, inasmuch as many equivalents or substitution of elements as well as modifications and improvements thereto, all of which embody the invention, become apparent to those skilled in the art upon reading this specification. Accordingly, it is requested that my invention be broadly construed within the full spirit and scope of the appended claims.

What I claim is:

1. An electronic countermeasures system operable at a frequency, $f$, of wavelength $\lambda$ comprising a receiving antenna, a transmitting antenna, first and second microwave energy coupling turnstile junctions each of which comprises:

four double ridge waveguide means, said waveguide means arranged in the form of a cross centered about an axis with an end of each opening into a common central region;

fifth quadridge circular waveguide means extending along said axis located at the juncture of said formed cross oriented orthogonal to said four waveguide means, said fifth waveguide means having an end in communication with said common central region, and said waveguide means having the remaining end thereof open for passing microwave energy;

impedance matching means located in said common central region;

two opposed ones of said four double ridge waveguide means each having an opening at a respective remaining end for passing microwave energy and the remaining two opposed ones of said double ridge waveguide means having microwave energy reflecting termination means located therewithin spaced from said axis;

and wherein the distance, $d_1$, between said axis and said energy reflecting termination means of one of said two opposed waveguide means is approximately equal to the quantity $(2N+3)(\lambda/8)$; and wherein the distance, $d_2$, between said axis and said energy reflecting termination means of the remaining one of said two opposed waveguide means is approximately equal to the quantity $(2N+1)(\lambda/8)$, where N is an integer, including zero, and where $\lambda$ equals one wavelength at the frequency $f$;

the effective distance between said reflecting termination means being equal to one-half wavelength, $\lambda$, at said frequency $f$;

means connecting the output of said receiving antenna to said fifth waveguide means of said first coupling turnstile junction;

means connecting the input of said transmitting antenna to the fifth waveguide means of said second coupling turnstile junction;

first signal processing means coupled between an end opening of one double ridge waveguide means of said first turnstile junction and the corresponding end opening of double ridge waveguide means of said second turnstile junction; and second signal processing means coupled between the end opening of remaining double ridge waveguide means of said first turnstile junction and the corresponding end opening of double ridge waveguide means of said second turnstile junction.

* * * * *